(12) United States Patent
Ohtsubo et al.

(10) Patent No.: US 7,404,832 B2
(45) Date of Patent: Jul. 29, 2008

(54) METHOD FOR PRODUCING CUBIC BORON NITRIDE ABRASIVE GRAINS

(75) Inventors: Hirohiko Ohtsubo, Shiojiri (JP); Eiji Ihara, Shiojiri (JP); Takuya Okubo, Shiojiri (JP); Makoto Kasahara, Shiojiri (JP); Makoto Iizuka, Shiojiri (JP)

(73) Assignee: Showa Denko K.K., Tokyo (JP)

( * ) Notice: Subject to any disclaimer, the term of this patent is extended or adjusted under 35 U.S.C. 154(b) by 138 days.

(21) Appl. No.: 10/478,102

(22) PCT Filed: May 21, 2002

(86) PCT No.: PCT/JP02/04906

§ 371 (c)(1),
(2), (4) Date: May 10, 2004

(87) PCT Pub. No.: WO02/094736

PCT Pub. Date: Nov. 28, 2002

(65) Prior Publication Data

US 2004/0182011 A1    Sep. 23, 2004

Related U.S. Application Data

(60) Provisional application No. 60/294,222, filed on May 31, 2001.

(30) Foreign Application Priority Data

May 21, 2001 (JP) .............................. 2001-150457

(51) Int. Cl.
*C09K 3/14* (2006.01)
*C04B 35/5831* (2006.01)
*C01B 21/064* (2006.01)

(52) U.S. Cl. .......................... 51/307; 51/293; 501/96.4; 423/290; 209/164

(58) Field of Classification Search .................. 51/307, 51/293, 295; 501/96.4; 423/290; 209/164
See application file for complete search history.

(56) References Cited

U.S. PATENT DOCUMENTS

| 4,016,244 | A | * | 4/1977 | Susa et al. | 423/290 |
| 5,000,760 | A |   | 3/1991 | Ohtsubo et al. |   |
| 5,443,605 | A | * | 8/1995 | Suzuki et al. | 423/290 |
| 5,472,461 | A | * | 12/1995 | Li | 51/296 |
| 5,772,756 | A | * | 6/1998 | Davies et al. | 117/79 |
| 5,975,988 | A | * | 11/1999 | Christianson | 451/28 |
| 6,039,775 | A | * | 3/2000 | Ho et al. | 51/295 |
| 6,248,303 | B1 |   | 6/2001 | Shioi et al. |   |

FOREIGN PATENT DOCUMENTS

| JP | 02-036293 A | 2/1990 |
| JP | 02-233510 A | 9/1990 |
| JP | 05-214320 A | 8/1993 |
| JP | 05-214321 A | 8/1993 |
| JP | 09 169971 A | 6/1997 |
| JP | 11-255506 A | 9/1999 |
| WO | WO 01 36081 A | 5/2001 |

OTHER PUBLICATIONS

Database WPI Week 199736 Derwent Publications Ltd., London, GB; AN 1997-389537.
Office Action from Japanese Patent Office dated Feb. 10, 2006, along with English translation of reasons for rejection.
Patent Abstracts of Japan, abstracting JP-A-09-169971 of Jun. 30, 1997.

* cited by examiner

*Primary Examiner*—Michael A Marcheschi
(74) *Attorney, Agent, or Firm*—Sughrue Mion, PLLC

(57) ABSTRACT

The present invention relates to a method for producing cubic boron nitride abrasive grains used for producing a grinding wheel, etc., and to cubic boron nitride abrasive grains. The method comprises maintaining a mixture containing hexagonal boron nitride and seed crystals of cubic boron nitride under pressure and temperature conditions where cubic boron nitride remains thermodynamically stable, characterized in that the seed crystals contain cubic boron nitride twin crystals.

4 Claims, 1 Drawing Sheet

(A)            (B)

METHOD FOR PRODUCING CUBIC BORON NITRIDE ABRASIVE GRAINS

This application claims the priority benefit of U.S. Provisional Application Ser. No. 60/294222 filed on May 31, 2001.

BACKGROUND OF THE INVENTION

1. Field of the Invention

The present invention relates to a method for producing cubic boron nitride abrasive grains used for producing a grinding wheel, etc., and to cubic boron nitride abrasive grains.

2. Description of the Related Art

Cubic boron nitride is second to diamond in hardness and its chemical stability is higher than that of diamond. Thus, cubic boron nitride is increasingly employed as abrasive grains for producing grinding material, polishing material, or cutting material.

A variety of methods for producing cubic boron nitride have been proposed. Among them, best known and widely employed in the industrial field is a method in which hexagonal boron nitride is maintained in the presence of a substance such as solvents (also called as catalysts) under conditions where cubic boron nitride remains thermodynamically stable (approximately 4-6 GPa, approximately 1,400-1,600° C.), to thereby transform hexagonal boron nitride directly into cubic boron nitride (disclosed, for example, in Japanese Patent Publication (kokoku) Nos. 59-39362, 3-14495, 3-47132, and 3-15488).

The cubic boron nitride abrasive grains obtained through any of these methods have high hardness and chemical stability as mentioned above, and are employed in electroplated grinding wheels, metal-bonded grinding wheels, etc.

The cubic boron nitride abrasive grains obtained through any of the aforementioned methods are almost spherical (i.e., blocky abrasive grains). Thus, these abrasive grains are not suitably employed in grinding by means of a vitrified bonded grinding wheel which is required to have low grinding power.

Japanese Patent Application Laid-Open (kokai) No. 9-169971 discloses that "cubic boron nitride abrasive grains having a sharp shape and a relatively low level of defects" are used in order to enhance low grinding power of a grinding wheel employing cubic boron nitride abrasive grains, leading to "sustained low grinding power." Although a grinding wheel employing cubic boron nitride abrasive grains produced through the above method attains improved grinding power as compared with a conventional grinding wheel employing blocky abrasive grains, grinding wheels of lower grinding power have been demanded in the industry.

The bond for use in the grinding surface of a vitrified bonded grinding wheel is melted to bind intergrain spaces during firing and provides strong bond strength after solidification through cooling. In order to attain excellent grinding power of a porous grinding wheel such as a vitrified bonded grinding wheel, porosity of the grinding wheel must be increased.

However, when the amount of a bond is reduced so as to increase porosity, retention of the abrasive grains is weakened, allowing falling of an increasing number of abrasive grains due to a load during grinding. Accordingly, the surface roughness of a work material deteriorates, and the interval between dressing operations is shortened, failing to attain a satisfactory grinding ratio. When the percentage of abrasive grain is reduced, the level of bridge structure among abrasive grains is lowered, to thereby decrease the hardness of the grinding wheel, even though retention of the abrasive grains is sufficient. Thus, the number of abrasive grains which cannot withstand the load imposed during grinding increases, resulting in falling of an increased number of abrasive grains and failing to attain a satisfactory grinding ratio.

In order to solve these problems, there is also proposed a method in which an aggregate is added so as to compensate for the reduction in abrasive particles or a bond. However, when an aggregate is added, the porosity of a grinding wheel decreases, thereby inhibiting enhancement of low grinding power.

SUMMARY OF THE INVENTION

The present inventors have carried out extensive studies in order to solve the aforementioned problems, and have found that, in a method for producing cubic boron nitride abrasive grains, particularly an ultra-high pressure method, cubic boron nitride abrasive grains (also "abrasive grains" are simply called as "particles") having a shape suitable for producing a vitrified bonded grinding wheel can be obtained by use of layered twin crystals as seed crystals of cubic boron nitride. The present invention has been accomplished on the basis of this finding.

Accordingly, the present invention provides the following:

(1) a method for producing cubic boron nitride abrasive grains including maintaining a mixture containing hexagonal boron nitride and seed crystals of cubic boron nitride under pressure and temperature conditions where cubic boron nitride remains thermodynamically stable, characterized in that the seed crystals contain cubic boron nitride twin crystals;

(2) a method for producing cubic boron nitride abrasive grains, characterized by comprising crushing cubic boron nitride abrasive grains produced through a method for producing cubic boron nitride abrasive grains as recited in (1);

(3) a method for producing cubic boron nitride abrasive grains as described in (2), wherein the cubic boron nitride abrasive grains are crushed by means of a roll crusher;

(4) a method for producing cubic boron nitride abrasive grains, characterized by comprising removing cubic boron nitride abrasive grains having an L/T ratio of 1.5 or less from cubic boron nitride abrasive grains produced through a method as recited in any one of (1) to (3), where L represents a major diameter (μm) and T represents a thickness (μm) defined in a three-axis system of cubic boron nitride abrasive grains;

(5) cubic boron nitride abrasive grains which are produced through a method for producing cubic boron nitride abrasive grains as recited in any one of (1) to (4);

(6) cubic boron nitride abrasive grains, characterized by having a packing ratio calculated by dividing a bulk density (unit: g/cm$^3$) thereof by the true density of cubic boron nitride (3.48 g/cm$^3$) falling within a range of:

0.482 to 0.282 when the abrasive grains are in a JIS-B4130 grit size fraction of 40/50;

0.480 to 0.280 when the abrasive grains are in a JIS-B4130 grit size fraction of 50/60;

0.478 to 0.278 when the abrasive grains are in a JIS-B4130 grit size fraction of 60/80;

0.474 to 0.274 when the abrasive grains are in a JIS-B4130 grit size fraction of 80/100;

0.469 to 0.269 when the abrasive grains are in a JIS-B4130 grit size fraction of 100/120;

0.464 to 0.264 when the abrasive grains are in a JIS-B4130 grit size fraction of 120/140;

0.459 to 0.259 when the abrasive grains are in a JIS-B4130 grit size fraction of 140/170;

0.453 to 0.253 when the abrasive grains are in a JIS-B4130 grit size fraction of 170/200;

0.446 to 0.246 when the abrasive grains are in a JIS-B4130 grit size fraction of 200/230;

0.440 to 0.240 when the abrasive grains are in a JIS-B4130 grit size fraction of 230/270;

0.433 to 0.233 when the abrasive grains are in a JIS-B4130 grit size fraction of 270/325; and 0.426 to 0.226 when the abrasive grains are in a JIS-B4130 grit size fraction of 325/400;

(7) cubic boron nitride abrasive grains as described in (6), which consist essentially of mono-crystalline particles;

(8) a grinding wheel which is produced from cubic boron nitride abrasive grains as recited in any one of (5) to (7), and a bond;

(9) a grinding wheel as described in (8), wherein the bond is a vitrified bond;

(10) a grinding wheel as described in (9), wherein the vitrified bond is incorporated into the grinding wheel in an amount falling within a range of 10 to 30% by volume;

(11) a grinding wheel as described in any one of (8) to (10), which has a percentage of abrasive grains falling within a range of ((packing ratio of cubic boron nitride abrasive grains−0.1)×100)% by volume to ((packing ratio of cubic boron nitride abrasive grains+0.05)×100)% by volume;

(12) a grinding wheel as described in any one of (8) to (10), which has a percentage of abrasive grains falling within a range of ((packing ratio of cubic boron nitride abrasive grains−0.05)×100)% by volume to ((packing ratio of cubic boron nitride abrasive grains+0.05)×100)% by volume; and

(13) coated abrasive produced by fixing cubic boron nitride abrasive grains as recited in any one of (5) to (7) on cotton cloth or similar cloth by use of an adhesive.

Figure 1:
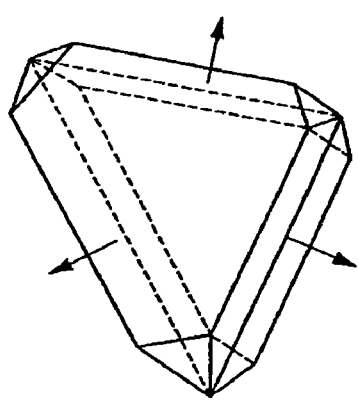
FIG. 1
Figure 1:
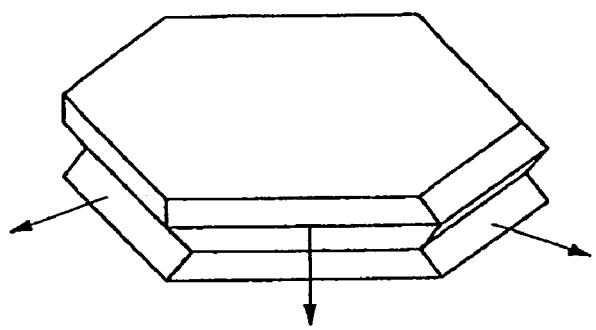

(A) A view of a twin crystal of cubic boron nitride, arrows indicating directions of preferential growth.

(B) A view of a layered twin crystal of cubic boron nitride, arrows indicating directions of preferential growth.

DETAILED DESCRIPTION OF THE PREFERRED EMBODIMENTS

The cubic boron nitride abrasive grains of the present invention has a packing ratio calculated by dividing a bulk density (unit: $g/cm^3$) thereof by the true density of cubic boron nitride ($3.48 \ g/cm^3$) falling within a range of:

0.482 to 0.282 when the abrasive grains are in a JIS-B4130 grit size fraction of 40/50;

0.480 to 0.280 when the abrasive grains are in a JIS-B4130 grit size fraction of 50/60;

0.478 to 0.278 when the abrasive grains are in a JIS-B4130 grit size fraction of 60/80;

0.474 to 0.274 when the abrasive grains are in a JIS-B4130 grit size fraction of 80/100;

0.469 to 0.269 when the abrasive grains are in a JIS-B4130 grit size fraction of 100/120;

0.464 to 0.264 when the abrasive grains are in a JIS-B4130 grit size fraction of 120/140;

0.459 to 0.259 when the abrasive grains are in a JIS-B4130 grit size fraction of 140/170;

0.453 to 0.253 when the abrasive grains are in a JIS-B4130 grit size fraction of 170/200;

0.446 to 0.246 when the abrasive grains are in a JIS-B4130 grit size fraction of 200/230;

0.440 to 0.240 when the abrasive grains are in a JIS-B4130 grit size fraction of 230/270;

0.433 to 0.233 when the abrasive grains are in a JIS-B4130 grit size fraction of 270/325; and 0.426 to 0.226 when the abrasive grains are in a JIS-B4130 grit size fraction of 325/400.

The packing ratio of conventionally employed cubic boron nitride abrasive grains is higher than that of the cubic boron nitride abrasive grains of the present invention. In order to improve the retention of the abrasive grains in a grinding wheel employing conventional cubic boron nitride abrasive grains, the level of the bridge structure of the abrasive grains must be sufficiently enhanced. This requirement inevitably leads to failure in reduction of the percentage of abrasive grains in the grinding wheel, with the grinding ratio being maintained.

It has been determined that, by use of the cubic boron nitride abrasive grains of the present invention having the aforementioned packing ratio, a sufficient level of bridge structure among abrasive grains can be attained, even though the percentage of abrasive grain is reduced. Thus, even when the percentage of abrasive grain in a grinding wheel is reduced, retention of abrasive grains in the grinding wheel does not drop; falling of abrasive grains can be prevented; and the grinding ratio is remarkably enhanced. In addition, the porosity of the grinding wheel is enhanced, leading to remarkable improvement in grinding power.

The packing ratio of the cubic boron nitride abrasive grains of the present invention is obtained by dividing a bulk density thereof by the true density of cubic boron nitride. The bulk density is measured through a method in accordance with "Bulk density test method of artificial abrasives" specified in JIS-R6126.

The measurement method will next be described specifically. The outlet of a funnel is plugged with a stopper, and a sample to be measured is placed in the funnel in an amount of 20.0±0.1 g. A cylinder (capacity: 8.0±0.1 ml) is placed just under the outlet of the funnel, and the fall distance from the outlet of the funnel to the top of the cylinder is adjusted to 95.0±1.0 mm. When the stopper is removed, the entirety of the sample falls into the cylinder. The portion of the sample protuberant from the top of the cylinder is removed by means of a metal plate, and the sample remaining in the cylinder is subjected to mass measurement. The measured mass is divided by the cylinder capacity, to thereby obtain the bulk density of the sample.

The above is a brief description of the measurement of the bulk density. In order to measure the bulk density more accurately, prior to measurement, the abrasive grains must be washed by use of diluted hydrochloric acid or aqua regia, then be subjected to removal of acid therefrom, and then be dried, so as to avoid influence attributed to matter such as deposits or stain on the abrasive grains.

The cubic boron nitride abrasive grains of the present invention have a packing ratio falling within the aforementioned range when the abrasive grains are in a specific JIS-B4130 grit size fraction. The abrasive grains belonging to different grit size fractions may be blended. The cubic boron nitride abrasive grains of the present invention having a specific packing ratio may be re-classified on the basis of another grit size fraction or another standard different from JIS-B4130.

No particular limitation is imposed on the method of synthesizing abrasive grains formed of cubic boron nitride that are employed in the present invention. However, in consideration of productivity, hexagonal boron nitride is preferably maintained in the presence of solvents under conditions where cubic boron nitride remains thermodynamically stable, to thereby transform hexagonal boron nitride into cubic boron nitride.

Commercial hexagonal boron nitride powder may be used as a starting material. However, hexagonal boron nitride of low oxygen content is preferably used, since oxygen impurities which migrate in the form of oxides such as boron oxide often retard transformation of hexagonal boron nitride into cubic boron nitride. No particular limitation is imposed on the particle size of hexagonal boron nitride, but a particle size, as defined in JIS-R6001, of 150 mesh or less is generally preferred, since excessively large particle sizes may deteriorate reactivity of hexagonal boron nitride with a solvent substance.

No particular limitation is imposed on the solvent employed in the method for transforming hexagonal boron nitride into cubic boron nitride, and any of known solvents can be used. Examples of the employable solvents include alkali metals (e.g., Li), nitrides thereof (e.g. $Li_3N$), boronitrides thereof (e.g., $Li_3BN_2$), alkaline earth metals (e.g., Ca, Mg, Sr, and Ba), nitrides thereof (e.g., $Ca_3N_2$, $Mg_3N_2$, $Sr_3N_2$, and $Ba_3N_2$), boronitrides thereof (e.g., $Ca_3B_2N_4$, $Mg_3B_2N_4$, $Sr_3B_2N_4$, and $Ba_3B_2N_4$), and complex boronitrides containing an alkali metal and an alkaline earth metal (e.g., $LiCaBN_2$ and $LiBaBN_2$). No particular limitation is imposed on the particle size of the solvents, but a particle size of 150 mesh or less is preferred, since excessively large particle sizes may deteriorate reactivity of hexagonal boron nitride with a solvent substance.

The solvent substance is added in an amount of preferably 5-50 parts by mass to 100 parts by mass of hexagonal boron nitride.

To attain co-existence of solvents and hexagonal boron nitride, a powder of the solvent substance and a powder of hexagonal boron nitride are mixed together. Alternatively, hexagonal boron nitride layers and solvent substance layers may be placed in a reactor such that these layers are alternately stacked.

Specifically, in a preferred mode, hexagonal boron nitride and a solvent substance, or a mixture thereof, is shaped at about 1-2 $t/cm^2$, and the resultant compact is charged into a reactor. Through employment of the method, manageability of raw material powders is improved and shrinkage of the raw material occurring in the reactor decreases, thereby enhancing productivity of cubic boron nitride abrasive grains.

In another preferred mode of the present invention, cubic boron nitride seed crystals are added in advance to the aforementioned compact containing solvents and hexagonal boron nitride or stacked product containing the same, to thereby promote growth of cubic boron nitride from the seed crystals serving as crystallization nuclei. In this case, the seed crystals may be coated with the solvent substance.

The aforementioned compact or similar material containing a catalyst substance, hexagonal boron nitride, and another substance is charged into a reactor, and the reactor is placed in a known high-temperature/high-pressure-generator, where the compact is maintained under temperature/pressure conditions where cubic boron nitride remains thermodynamically stable. The thermodynamically stable conditions are described by O. Fukunaga in Diamond Relat. Mater., 9, (2000), 7-12 and generally fall within ranges of about 4 to about 6 GPa and about 1,400 to about 1,600° C. The compact is typically maintained thereat for about 1 second to about 6 hours.

By maintaining the compact under the aforementioned conditions where cubic boron nitride remains thermodynamically stable, hexagonal boron nitride is transformed into cubic boron nitride. In general, a synthesis ingot containing hexagonal boron nitride, cubic boron nitride, and solvents are yielded. The thus-yielded syntheses ingot is disintegrated for isolating and purifying cubic boron nitride.

A method for isolation and purification described in Japanese Patent Publication (kokoku) No. 49-27757 may be employed. In one method, the yielded synthesis ingot is disintegrated into granules of a size of 5 mm or less, and sodium hydroxide and a small amount of water are added to the granules. The mixture is heated at about 300° C., to thereby selectively dissolve hexagonal boron nitride. The mixture is cooled, and undissolved matter is washed sequentially with acid and water and separated through filtration, to thereby yield cubic boron nitride abrasive grains.

Among the thus-obtained cubic boron nitride abrasive grains, those useful in the present invention consist essentially of mono-crystalline abrasive grains. Although the cubic boron nitride abrasive grains contain, in addition to mono-crystals thereof, cubic boron nitride abrasive grains such as polycrystalline grains and microcrystalline grains, mono-crystals are preferably used In the present invention. Polycrystalline or microcrystalline cubic boron nitride abrasive grains have comparatively high grain strength and are resistant to chipping. When such abrasive grains are employed in a grinding wheel, cutting edges of the abrasive grains tend to undergo abrasion and wear. Thus, polycrystalline or microcrystalline abrasive grains are not suitable as cubic boron nitride abrasive grains of the present invention. In the present invention, the concept "abrasive grains consisting essentially of mono-crystalline grains" excludes polycrystalline abrasive grains and microcrystalline abrasive grains.

In the present invention, cubic boron nitride abrasive grains which consist essentially of mono-crystalline grains are defined as cubic boron nitride abrasive grains containing the aforementioned mono-crystalline abrasive grains in amounts of 90% by volume or more, preferably 95% by volume or more, and more preferably 99% by volume or more. The above-specified percentage is based solely on cubic boron nitride and does not take into account other impurities.

The cubic boron nitride abrasive grains obtained through the above method are classified according to grit size fractions defined in JIS-B4130. From each fraction, blocky abrasive grains are removed by use of a shape selector or a similar device, to thereby yield cubic boron nitride abrasive grains having a packing ratio falling within the scope of the present invention.

The term "blocky abrasive grains" refers to crystal particles of generally spherical shape, more specifically, those having an L/T ratio of approximately 1, wherein L represents a major diameter (μm) and T represents a thickness (μm) defined in a three-axis system of a crystal particle. The three-axis system described herein is employed to quantify the shape of particles having an irregular shape by converting the irregular shape to a corresponding rectangular parallelpiped, and is recited on page 1 of *Funtai Kogaku Binran* (first edition, first printing (1986), edited by The Society of Powder Technology, Japan).

Briefly, two parallel lines are provided so as to sandwich the projection view of a particle placed on an arbitrary plane under a static condition. When the lines are in contact with the projection view, the distance between the two lines is measured. The longest distance serves as the major diameter L (μm) of the particle, and the distance between two other lines in contact with the projection view in a direction normal to the line along the longest distance serves as the minor diameter B (μm) of the particle. The height from the plane on which the particle is placed under a static condition to the top of the particle serves as the thickness T (μm). In the present invention, the thickness T (μm) of the three-axis system is the smaller value selected from the minor diameter B (μm) and the thickness T (μm).

According to the present invention, cubic boron nitride abrasive grains having a packing ratio falling within the scope of the invention can be obtained by decreasing the percentage of abrasive grains having an L/T ratio of 1.5 or less by means of a shape selector or a similar device. The expression "removing cubic boron nitride abrasive grains having an L/T ratio of 1.5 or less" in the production method of the present invention refers to a step of "decreasing the percentage of cubic boron nitride abrasive grains having an L/T ratio of 1.5 or less."

Any device can be employed as the shape selector, so long as the device attains the aforementioned purpose. Specifically, a method in which abrasive grains having a low L/T ratio are removed through vibration may be employed.

The structure of one specific example of the shape selector employed in; the above method will now be described. A vibration plate is in the form of a regular triangle (apexes A, B, and C), and a side wall for preventing falling of abrasive grains is provided at each of the sides AB and AC. The vibration plate is inclined such that the apex B is positioned upward with respect to the side AC serving as an inclination axis. The inclination angle with respect to the horizontal is preferably 1-45°. The vibration plate is further inclined such that the apex A declines to the apex C. The declination angle of the side AC with respect to the horizontal is preferably 1-30°.

While the vibration plate is vibrated, abrasive grains are fed toward the apex A and discharged from the side BC. The fed abrasive grains move down from the apex A to the side BC through vibration. In the course of this step, blocky abrasive grains having a generally spherical shape tend to fall to a lower part and move along the side AC. In contrast, irregular-shape abrasive grains (i.e., non-blocky abrasive grains) are elevated to a high-altitude portion through vibration and are discharged from a portion near the apex B on the side BC. By segregating the outlet on the side BC, abrasive grains from which blocky (generally spherical) abrasive grains have been removed can be obtained.

Among grit size fractions defined in "Particle size of diamond and cubic boron nitride" (JIS-B4130), those relevant to the present invention are summarized in Table 1. The particle size distribution In Table 1 was obtained by use of an electroform sieve.

In order to enhance the yield of cubic boron nitride abrasive grains having a packing ratio falling within the scope of the present invention, the step for producing cubic boron nitride abrasive grains preferably includes a step of crushing cubic boron nitride abrasive grains. Specifically, a crushing method in which cubic boron nitride abrasive grains are broken by a pressure load is preferred. More specifically crushing by means of a roll crusher is preferred.

In the crushing method by means of a roll crusher, abrasive grains are pressed and crushed between two rolls. The method is based on crushing by applying compressive and shear stress to abrasive grains, and the abrasive grains can be crushed by relatively strong force applied over a short period of time. Thus, the abrasive grains are not generally over-crushed beyond what is required and are not generally formed into blocky abrasive grains having a rounded shape, to thereby enhance the yield of cubic boron nitride abrasive grains having a packing ratio falling within the scope of the present invention.

An alternative method for producing cubic boron nitride abrasive grains having a packing ratio falling within the scope of the present invention will now be described. In the method, hexagonal boron nitride is maintained in the presence of solvents under ultra-high pressure/temperature conditions, to thereby transform hexagonal boron nitride into cubic boron nitride, directly yielding abrasive grains having a packing ratio falling within the scope of the present invention. More specifically, in the method for producing cubic boron nitride abrasive grains, which method includes maintaining a mixture containing hexagonal boron nitride and seed crystals of cubic boron nitride under pressure/temperature conditions where cubic boron nitride remains thermodynamically stable, twin crystals or layered twin crystals are used as seed crystals of cubic boron nitride, to thereby yield cubic boron nitride abrasive grains having a packing ratio falling within the scope of the present invention.

The term "twin crystal" refers to a crystal having two portions which are mutually symmetrical. FIG. 1 shows a schematic view of the crystal morphology of one specific twin crystal. The reason for yielding cubic boron nitride abrasive grains having a packing ratio falling within the scope of the present invention by use of twin crystals as seed crystals is as follows. At concave portions of a twin crystal, generation of crystal nuclei occurs one-dimensionally; i.e., in specific crystal orientations. Accordingly, crystal growth in these directions occurs at a remarkably different rate as compared with other crystal orientations, and anisotropic growth of crystal grains increases. Thus, irregular-shape abrasive grains tend to grow, leading to easy production of cubic boron nitride abrasive grains having a packing ratio falling within the scope of the present invention.

For example, in a twin crystal shown in FIG. 1(A), crystal growth occurs preferentially in three directions represented by the arrows. When layered twin crystals having two or more twinning planes as shown in FIG. 1(B) are used as seed crystals, the number of planes having a concave portion increases. Thus, cubic boron nitride abrasive grains having a packing ratio falling within the scope of the present invention are more readily grown as compared with the case in which seed crystals as shown in FIG. 1(A) are used.

When a grinding wheel is produced by use of the cubic boron nitride abrasive grains of the present invention, a high grinding ratio and low grinding power can be attained. Particularly, the effect is remarkably exerted in the case of a porous vitrified bonded grinding wheel.

The percentage of abrasive grains of a vitrified bonded grinding wheel preferably falls within a range of ((packing ratio of cubic boron nitride abrasive grains−0.1)×100)% by volume to ((packing ratio of cubic boron nitride abrasive grains+0.05)×100)% by volume, particularly preferably ((packing ratio of cubic boron nitride abrasive grains−0.05)×100)% by volume to ((packing ratio of cubic boron nitride abrasive grains+0.05)×100)% by volume. When the percentage of abrasive grains is less, than ((packing ratio of cubic boron nitride abrasive grains−0.1)×100)% by volume, sufficient bridge structures among abrasive grains and sufficient retention of abrasive grains are not attained, thereby lowering the grinding ratio, whereas when the percentage of abrasive grains is in excess of ((packing ratio of cubic boron nitride abrasive grains+0.05)×100)% by volume, sufficient bridge structures among abrasive grains is attained, but edges of the abrasive grains are chipped or the abrasive grains break themselves due to forced packing of the abrasive grains during formation of a grinding wheel, resulting in falling of such chipped or damaged abrasive grains during grinding and a decrease in grinding ratio.

The percentage of abrasive grains refers to a percent volume of abrasive grains based on the volume of the grinding wheel.

For producing vitrified bonded grinding wheels, any bond which is typically employed for binding cubic boron nitride abrasive grains can be used in accordance with the purpose of use. Examples of such bond include bonds predominantly containing $SiO_2$—$Al_2O_3$. The amount of the bond incorporated in a grinding wheel preferably falls within a range of 10 to 30% by volume. When the amount is less than 10% by volume, retention of the abrasive grains decreases and the number of falling abrasive grains increases, resulting in a decreased grinding ratio not suitable for a grinding tool. When the amount is in excess of 30% by volume, the porosity of a grinding wheel decreases, resulting in deterioration of grinding power of the grinding wheel, and increase in volume (foaming) tends to occur during firing for producing a grinding wheel, these effects being disadvantageous.

Additives (e.g., aggregates and bonding aids) or similar substances which are typically used for producing a grinding wheel employing cubic boron nitride abrasive grains may also be used.

The cubic boron nitride abrasive grains of the present invention are suitably employed in grinding wheels produced by use of other types of bond, coated abrasives, etc., as well as in the aforementioned vitrified bonded grinding wheels. The term "coated abrasive" refers to a grinding material containing abrasive grains fixed by use of an adhesive on cloth. Specifically, the grinding cloth is produced by fixing abrasive grains on cotton cloth or similar cloth by use of an adhesive such as glue, gelatin, or synthetic resin.

EXAMPLES

The present invention will next be described by way of examples, which should not be construed as limiting the invention thereto.

Example 1

$LiCaBN_2$ (15 parts by mass) serving as a cBN synthesis solvents and cubic boron nitride abrasive grains (0.5 parts by mass) containing large amounts of twin crystals (mean particle size: 30μ) as shown in FIG. 1 and serving as seed crystals were added to hBN (UHP-1, product of Showa Denko K. K.; mean particle size: 8-10μ; purity: 98%) (100 parts by mass), to thereby yield a mixture. The mixture was molded at a molding density of 1.92 g/cm$^3$, to thereby yield a compact. The compact was charged into a reactor, and the reactor was placed in a high-temperature/high-pressure-generator, where synthesis was carried out at 5 GPa and 1,500° C. for 15 minutes. After completion of synthesis, the yielded synthesis ingot was removed from the reactor and disintegrated into granules of a size of 5 mm or less, and sodium hydroxide and a small amount of water were added to the granules. The mixture was heated at about 300° C., to thereby selectively dissolve hexagonal boron nitride. The mixture was cooled, and undissolved matter was washed sequentially with acid and water and separated through filtration for purification, to thereby yield transparent, yellow cubic boron nitride abrasive grains.

The thus-obtained cubic boron nitride abrasive grains contain mono-crystalline particles in an amount of 99% or more.

Example 2

The procedure of Example 1 was repeated, except that no seed crystals of cubic boron nitride were added to thereby yield a mixture, synthesize cubic boron nitride abrasive grains, and isolate and purify the abrasive grains.

The thus-obtained cubic boron nitride abrasive grains contain mono-crystalline particles in an amount of 99% or more.

Example 3

The cubic boron nitride abrasive grains obtained in Example 1 were classified into grit size fractions defined in JIS-B4130. The abrasive grains belonging to the 100/120 grit size fraction were washed with diluted hydrochloric acid, were subjected to removal of acid therefrom, and were dried. The bulk density of the dried abrasive grains was measured, to thereby determine the packing ratio thereof.

The bulk density was measured in the following manner. The outlet of a funnel was plugged with a stopper, and cubic boron nitride abrasive grains to be measured were placed in the funnel in an amount of 20.0±0.1 g. A cylinder (capacity: 8.0±0.1 ml) was placed just under the outlet of the funnel, and the fall distance from the outlet of the funnel to the top of the cylinder was adjusted to 95.0±1.0 mm. When the stopper was removed, the entirety of the cubic boron nitride abrasive grains was caused to fall into the cylinder. The portion of the cubic boron nitride abrasive grains protuberant from the top of the cylinder was removed by means of a metal plate, and the cubic boron nitride abrasive grains remaining in the cylinder was subjected to mass measurement. The measured mass was divided by the volume of the cylinder, to thereby obtain the bulk density.

The packing ratio of the abrasive grains belonging to the 100/120 grit size fraction is shown in Table 2.

Example 4

The cubic boron nitride abrasive grains obtained in Example 2 were classified into grit size fractions defined in JIS-B4130. From the abrasive grains belonging to the 100/120 grit size fraction, blocky abrasive grains were removed by use of the aforementioned shape selector.

The shape selector employing a vibration plate in the form of a regular triangle with each side having a length of approximately 1 m was used. The vibration plate (apexes A, B, and C) was inclined at 13° such that the apex B was positioned upward with respect to the side AC serving as an inclination axis. The vibration plate was further inclined at 7° such that the apex A declines to the apex C.

The percentage of abrasive grains having an L/T ratio of 1.5 or less contained in the cubic boron nitride abrasive grains was reduced by use of the shape selector. Subsequently, the thus-treated cubic boron nitride abrasive grains were washed with diluted hydrochloric acid, were subjected to removal of acid therefrom, and were dried. In a manner similar to that of Example 3, the bulk density of the dried abrasive grains was measured, to thereby determine the packing ratio thereof.

The packing ratio of the abrasive grains in the 100/120 grit size fraction is shown in Table 2.

Example 5

The cubic boron nitride abrasive grains obtained in Example 2 were crushed by means of a roll crusher.

A roll crusher (product of Yoshida Seisaku-sho) was used. Each of the rolls employed in the roll crusher has a diameter of 140 mm and a length of 140 mm and is made of hardened steel. While a load of 50 kgf (490 N) was applied to the rolls, cubic boron nitride abrasive grains were fed at 20 g/minute to the rolls rotating at 100 rpm, to thereby crush the abrasive grains.

The thus-crushed cubic boron nitride abrasive grains were classified into grit size fractions defined in JIS-B4130. The abrasive grains in the 100/120 grit size fraction were washed with diluted hydrochloric acid, were subjected to removal of acid therefrom, and were dried. In a manner similar to that of Example 3, the bulk density of the dried abrasive grains was measured, to thereby determine the packing ratio thereof.

The packing ratio of the abrasive grains in the 100/120 grit size fraction is shown in Table 2.

Example 6

The cubic boron nitride abrasive grains obtained in Example 2 were crushed under conditions similar to those of Example 5.

The thus-crushed cubic boron nitride abrasive grains were classified into grit size fractions defined in JIS-B 4130. In a manner similar to that of Example 4, the percentage of abrasive grains having an L/T ratio of 1.5 or less contained in the abrasive grains in the 100/120 grit size fraction was reduced by means of a shape selector, and the thus-treated abrasive grains were washed with diluted hydrochloric acid, were subjected to removal of acid therefrom, and were dried. In a manner similar to that of Example 3, the bulk density of the dried abrasive grains was measured, to thereby determine the packing ratio thereof.

The packing ratio of the abrasive grains belonging to the 100/120 grit size fraction is shown in Table 2.

Comparative Example 1

The cubic boron nitride abrasive grains obtained in Example 2 were classified to grit size fractions defined in JIS-B4130. The abrasive grains belonging to the 100/120 grit size fraction were washed with diluted hydrochloric acid, were subjected to removal of acid therefrom, and were dried. In a manner similar to that of Example 3, the bulk density of the dried abrasive grains was measured, to thereby determine the packing ratio thereof.

The packing ratio of the abrasive grains in the 100/120 grit size fraction is shown in Table 2.

Examples 7 and 8 and Comparative Examples 2 to 6

Each grinding wheel segment was produced by use of the abrasive grains obtained in Example 3 or those obtained in Comparative Example 1. Specifically, a mixture containing the abrasive grains, a borosilicate glass bond serving as a binding agent, and a binder (phenolic resin) was prepared; the mixture was press-formed at 150° C.; and the resultant compact was fired at 1000° C. (in the atmosphere). The employed binder was burnt to form pores during firing for producing grinding wheel segments. The type of abrasive grains used to form each grinding wheel segment, the proportion thereof, the porosity and the percentage of abrasive grain of the fired product, and the bending strength of each segment are shown in Table 3.

Examples 9 and 10 and Comparative Examples 7 to 11

Each of the grinding wheel segments produced in Examples 7 and 8 and Comparative Examples 2 to 6 was bonded to an aluminum alloy wheel, to thereby form a grinding wheel, and the grinding wheel was subjected to a grinding test under the following conditions. The results are shown in Table 4.

Grinding wheel: 1A1 type, 150 D×10 U×3 X×76.2 H

Grinding machine: Horizontal-spindle surface grinding machine (grinding wheel spindle motor: 3.7 kW)

Work material: SKH-51 (HRc=62-64)

Surface area of work material: 200 mm x 100 mm Method of grinding: Wet surface traverse grinding Grinding Conditions:

Grinding wheel peripheral speed: 1800 m/min.

Table speed: 15 m/min.

Cross rail feed rate: 5 mm/pass

Depth of out: 25 µm

Grinding fluid: JIS W2, exclusively for cBN (×50 diluted)

TABLE 1

| | 1st sieve | 2nd sieve | | 3rd sieve | | | 4th sieve |
|---|---|---|---|---|---|---|---|
| | A | B | | C | | D | E |
| | µm | µm | % | µm | % | % | µm |
| 40/50 | 600* | 455 | 8 | 302 | 90 | 8 | 213 |
| 50/60 | 455 | 322 | 8 | 255 | 90 | 8 | 181 |
| 60/80 | 384 | 271 | 8 | 181 | 90 | 8 | 127 |
| 80/100 | 271 | 197 | 10 | 151 | 87 | 10 | 107 |
| 100/120 | 227 | 165 | 10 | 127 | 87 | 10 | 90 |
| 120/140 | 197 | 139 | 10 | 107 | 87 | 10 | 75 |
| 140/170 | 165 | 116 | 11 | 90 | 85 | 11 | 65 |
| 170/200 | 139 | 97 | 11 | 75 | 85 | 11 | 57 |
| 200/230 | 116 | 85 | 11 | 65 | 85 | 11 | 49 |
| 230/270 | 97 | 75 | 11 | 57 | 85 | 11 | 41 |
| 270/325 | 85 | 65 | 15 | 49 | 80 | 15 | — |
| 325/400 | 75 | 57 | 15 | 41 | 80 | 15 | — |

A: Sieve through which 99.9% particles must pass
B: Sieve on which particles must not remain in predetermined amounts or more, and the amounts
C: Sieve on which particles must remain in predetermined amounts, and the amounts
D: Maximum amounts of particles which may pass through the sieve
E: Sieve through which at least 2% of particles must fail to pass
*Not use of an electroform sieve.

TABLE 2

| | Cubic boron nitride abrasive grains used | Packing ratio of abrasive grains in 100/120 grit size fraction |
|---|---|---|
| Example 3 | Example 1 | 0.43 |
| Example 4 | Example 2 | 0.45 |
| Example 5 | Example 2 | 0.48 |
| Example 6 | Example 2 | 0.44 |
| Comp. Ex. 1 | Example 2 | 0.53 |

TABLE 3

| | Cubic boron nitride abrasive grains used | Proportions (vol. %) abrasive grains-bond-binder | Grinding wheels (after firing) | | |
|---|---|---|---|---|---|
| | | | Porosity (vol. %) | Grain volume percentage (vol. %) | Bending (kg/mm²) |
| Example 7 | Example 3 | 45-20-10 | 35 | 45 | 5.53 |
| Example 8 | Example 3 | 35-20-10 | 45 | 35 | 5.38 |
| Comp. Ex. 2 | Example 3 | 50-20-10 | 30 | 50 | 4.92 |
| Comp. Ex. 3 | Example 3 | 30-20-10 | 50 | 30 | 2.61 |
| Comp. Ex. 4 | Comp. Ex. 1 | 50-8-10 | 42 | 50 | 3.84 |
| Comp. Ex. 5 | Comp. Ex. 1 | 50-20-10 | 30 | 50 | 5.31 |
| Comp. Ex. 6 | Comp. Ex. 1 | 40-20-10 | 40 | 40 | 4.07 |

TABLE 4

| | Grinding wheel used | Grinding ratio | Grinding power (W) |
|---|---|---|---|
| Example 9 | Example 7 | 1,683 | 920 |
| Example 10 | Example 8 | 1,622 | 940 |
| Comp. Ex. 7 | Comp. Ex. 2 | 1,229 | 1,190 |
| Comp. Ex. 8 | Comp. Ex. 3 | 627 | 970 |
| Comp. Ex. 9 | Comp. Ex. 4 | 878 | 1,260 |
| Comp. Ex. 10 | Comp. Ex. 5 | 1,582 | 1,780 |
| Comp. Ex. 11 | Comp. Ex. 6 | 1,060 | 1,430 |

Industrial Applicability

The cubic boron nitride abrasive grains of the present invention have a packing ratio lower than that of conventional cubic boron nitride abrasive grains. Thus, a high level of bridge structure among abrasive particles can be maintained, despite a reduction in a percentage of abrasive grains. Thus, a grinding wheel employing the cubic boron nitride abrasive grains of the present invention attains high hardness, high bending strength, and high retention of abrasive grains, even when the porosity is elevated. In addition, by use of the cubic boron nitride abrasive grains of the present invention, a grinding wheel having excellent grinding power can be produced without decreasing the grinding ratio of the grinding wheel.

Particularly, the cubic boron nitride abrasive grains of the present invention are suitably employed in a vitrified bonded grinding wheel. The vitrified bonded grinding wheel employing the cubic boron nitride abrasive grains of the present invention serves as a porous grinding wheel and exerts excellent grinding performance.

What is claimed is:

1. A method for producing cubic boron nitride abrasive grains comprising:
   (A) a step of providing a mixture containing hexagonal boron nitride and seed crystals of cubic boron nitride, said seed crystals containing cubic boron nitride twin crystals; and
   (B) subjecting the mixture of step (A) to pressure and temperature conditions in which cubic boron nitride remains thermodynamically stable to transform hexagonal boron nitride to cubic boron nitride,
   wherein the cubic boron nitride abrasive grains consist essentially of mono-crystalline particles.

2. A method for producing cubic boron nitride abrasive grains according to claim 1, further comprising a step of crushing said cubic boron nitride abrasive grains.

3. A method for producing cubic boron nitride abrasive grains according to claim 2, wherein the cubic boron nitride abrasive grains are crushed by means of a roll crusher.

4. A method for producing cubic boron nitride abrasive grains comprising a step of removing cubic boron nitride abrasive grains having an L/T ratio of 1.5 or less from cubic boron nitride abrasive grains that we produced according to the method of any one of claims 1 to 3, where L represents a major diameter (μm) and T represents a thickness (μm) defined in a three-axis system of cubic boron nitride abrasive grains.

* * * * *